Patented Aug. 18, 1953

2,649,433

UNITED STATES PATENT OFFICE 2,649,433

RESOL-ALKYD RESIN PRODUCT

Herbert Hönel, Hamburg-Wandsbek, Germany, and Heinrich Manzano, Vienna, Austria

No Drawing. Application July 22, 1947, Serial No. 762,789. In Germany November 1, 1941

Section 1, Public Law 690, August 8, 1946
Patent expires November 1, 1961

7 Claims. (Cl. 260—44)

In our application, Ser. No. 762,788, filed July 22, 1947, now Patent No. 2,613,198, dated October 7, 1952, a process is described for producing hardenable resins by combining resols derived from phenols having more than two reaction favourable positions and carrying a restricted number of aliphatic C-atoms per phenolic hydroxyl group, with so-called alkyd resins (condensation products of the polyvalent alcohol-polybasic carboxylic acid type) which contain a substantial surplus of free hydroxyl groups. Advantageously the two components, resol and alkyd resin are mutually interacted by heating them for a prolonged period of time, for example for several hours below the hardening temperature. Presumably an at least partial etherification between the methylol groups of the resol (phenol-alcohol) and the free hydroxyl groups of the alkyd resin takes place. Alkyd resins having free primary hydroxyl groups (obtained by employing a suitable polyvalent hydroxyl-compound) are chosen by preference because these, as experience has shown, much more readily enter into etherification reaction than secondary or tertiary ones. The products obtained above all shall serve as bases for heat hardening varnishes.

Now it has been found that also resols derived from phenol itself may be completely homogeneously combined with such alkyd resins, if only a comparatively large excess of free hydroxyl groups—preferably primary ones—is present in the alkyd resin. The presence of one free gram-hydroxyl group in 250 g. or less may be taken as an approximate rule. When we employ the term "excess" or "surplus" of free hydroxyl groups, we wish it to be understood that the number of hydroxyl groups present in the components used as starting materials for producing the alkyd resin exceeds that of the carboxyl groups. Thus according to the invention in the process of producing hardenable resins a resol derived from phenol is combined with alkyd resins having a surplus of one free, preferably primary, gram-hydroxyl group in 250 g. or less by heating below the hardening temperature of the resol removing the water and interrupting the heating before gelatinization takes place.

The phenol resols are suitably employed in an as low molecular condition as possible and containing a substantial excess of formaldehyde bound, i. e. they suitably have to be, partially at least, phenol polymethylol compounds. Then not only a homogeneous combination with the alkyd resin is the more readily effected but heat hardened films are also formed showing superior mechanical properties, adhesiveness and a more even surface. These properties also seen to be due to an extensive chemical homogeneity of the combination product caused by etherification processes which lead to mutual cross linkages. That these take place is proved by the increase in solubility of the combination products in ester-like solvents and aromatic hydrocarbons in the course of the reaction which is accompanied by the formation of water.

The proportion between phenol-alcohol and alkyd resin may vary within broad limits. As a rule the alkyd resin is the chief component, in a given case even a multiple of the weight of the phenol, even if the alkyd resin is only thickly liquid. Apart from the plastifying effect aimed at it is, however, also suitable that the number of the free hydroxyl groups of the alkyd resin does not, at least not essentially, exceed the number of the methylol groups of the resol. If this rule is followed the heat hardened films show an even surface and a very high resistance against water even when an alkyd resin especially rich in hydroxyl groups (e. g. one containing one free gram-hydroxyl group in only 120 g.) has been employed which already has a distinctly hydrophilic character and which, apart from this property being detrimental for varnish purposes, in consequence thereof, similar to the resols of the phenol itself, causes disturbances of the flow, such as the formation of craters etc. In order to obtain best flow and lustre of the film it is, however, advisable to introduce lyophilic groups.

It is probably due to the high reactivity and to the constitution of a polymethylol compound of the phenol itself that in the course of the proceeding mutual etherification processes with the alkyd resin which is to be employed according to the invention (which on its part may carry 10 or more reactive hydroxyl groups in the molecule) mechanically very resistant, highly elastic and moreover very tenaciously adhering films are finally obtained. In consequence of their structure, as a rule, they are not attacked by mixtures of solvents of the most various kinds.

In spite of the fact that the alkyd resin often by far predominates as regards the quantity, the new products are also distinguished by quick hardening capacity, hardening temperatures of 150–175° during ½ to 1 hour being as a rule sufficient. The duration and temperature of hardening may be further reduced by adding suitable acid catalysts. If in producing the resol employed a part of the phenol is substituted by the still more reactive m-cresol or even by a dihydroxy benzene, such as resorcinol, the reactivity of the final product may still be increased.

In accordance with the process described in our application Ser. No. 762,788 (German application B 193,455), also here the mutual interaction of the two components may be effected in the presence of a thinning agent. The initial solubility conditions both of the alkyd resin and the resol, however, mostly require the co-employment of at least a portion of an alcoholic solvent in the beginning. Since primary alcohols readily undergo etherification, which generally is not desired in the present process, we prefer to employ a secondary or tertiary alcohol which may serve as such a solvent without endangering the purpose aimed at because their reactivity with the methylol groups of the resol is by far inferior to that of the primary hydroxyl groups of the alkyd resin. In certain cases, however, e. g. in order to increase the lyophilic character of the final product, also a restricted proportion of a comparatively high primary alcohol may be co-employed systematically.

Because the etherification process is accompanied by the formation of water it is promoted by removing as quickly and as carefully as possible the reaction water or the water which may be present in the beginning. This may be supported by employing diminished pressure or by co-employing a readily volatile, water-immiscible indifferent solvent such as benzene, the latter being in a given case continuously recycled into the reaction mixture. The etherification process is catalytically accelerated by the presence of substances having an acid action. Substances which are insoluble in water but soluble in the reaction mixture are preferred. Catalysts of this type are well known and suitable catalysts for the purpose are set forth in the examples in our application Serial No. 762,788, filed July 22, 1947.

*Examples*

1. 1000 g. phenol and 300 g. formaldehyde (30 p. c.) are condensed in the presence of caustic alkalies during several days at 30 to 35°. Then the reaction mixture is carefully neutralised or only slightly acidified (pH>5) and concentrated in vacuum until the corresponding salts separate out, and freed from these in a suitable manner. The yield is about 1800 g. If instead of caustic alkalies barium hydroxide is used as condensing agent this may be converted into a water insoluble compound and removed already before vacuum is applied.

180 parts of the condensation product obtained are heated together with 150 to 250 parts of an almost neutral ester derived from 1 mol adipic acid and 1½ mol trimethylolpropane at temperatures between 90 and 130°, the reaction water being removed. The heating is suitably carried out in the presence of benzol and a secondary or tertiary alcohol which results in the solubility of the alkyd and resol therein, the benzol which distills off together with the water vapors being continuously recycled. The reaction is catalyzed by adding a catalytic proportion of a substance having an acid action. The benzol is finally distilled off and the residue is thinned in a suitable manner by adding xylol and butanol or the like.

By hardening the varnish at 160 to 170° during 1 hour an extremely elastic, tenaciously adhering film is obtained showing very high resistance against mechanical actions as well as against mixtures of solvents (motor fuels).

2. 180 parts of the condensation product obtained from phenol and formaldehyde according to Example 1 are combined in the manner described there with 250 to 350 parts of an almost neutral ester derived from 100 g. citric acid, 150 g. "Vorlauffettsäure," 150 g. trimethylolpropane and 60 g. penta-erythrite. The substance referred to as "Vorlauffettsäure" comprises the fatty acid first runnings obtained by catalytically oxidizing paraffine; the molecular weight averages about 130, corresponding to an acid number of about 430.

The varnish finally obtained when hardened at 160–170° forms films of extraordinary elasticity and high lustre and also otherwise good properties similar to that obtained according to Example 1.

We claim:

1. In a process of producing a hardenable resin, the improvement which comprises combining (1) a hardenable low molecular resol obtained from phenol and formaldehyde and free from alkaline catalyst, with (2) a substantially neutral plasticizing alkyd resin containing long aliphatic chains and having an excess of free alcoholic OH groups over the carboxylic groups of the ester forming components, said excess amounting to at least one-gram OH group per 250 g. of the resin, by protracted heating beyond the point of removal of the water contained in the condensation product in a slightly acid medium at a temperature and for a period insufficient for carrying out the hardening reaction but sufficient for effecting etherification, and interrupting the heating before gelation takes place.

2. In a process of producing a hardenable resin, the improvement which comprises combining (1) a hardenable low molecular resol obtained from phenol and formaldehyde and free from alkaline catalyst, with (2) an excess of a substantially neutral plasticizing alkyd resin containing long aliphatic chains and having an excess of free alcoholic OH groups over the carboxylic groups of the ester forming components, said excess amounting to at least one-gram OH group per 250 g. of the resin, by protracted heating beyond the point of removal of the water contained in the condensation product in a slightly acid medium at a temperature and for a period insufficient for carrying out the hardening reaction but sufficient for effecting etherification, and interrupting the heating before gelation takes place.

3. In a process of producing a hardenable resin, the improvement which comprises combining (1) a hardenable low molecular resol obtained from phenol and formaldehyde and free from alkaline catalyst, with (2) a substantially neutral plasticizing alkyd resin containing long aliphatic chains and having an excess of free primary alcoholic OH groups over the carboxylic groups of the ester forming components, said excess amounting to at least one-gram OH group per 250 g. of the resin, by protracted heating beyond the point of removal of the water contained in the condensation product in a slightly acid medium at a temperature and for a period insufficient for carrying out the hardening reaction but sufficient for effecting etherification, and interrupting the heating before gelation takes place.

4. In a process of producing a hardenable resin, the improvement which comprises combining (1) a hardenable low molecular resol obtained from phenol and formaldehyde and free from alkaline catalyst obtained from a mixture of phenols containing in addition to phenol a portion of other phenols which form more reactive resols than phenol, with (2) a substantially neutral plasticizing alkyd resin containing long aliphatic chains and having an excess of free alcoholic OH groups over the carboxylic groups of the ester forming components, said excess amounting to at least one-gram OH group per 250 g. of the resin, by protracted heating beyond the point of removal of the water contained in the condensation product in a slightly acid medium at a temperature and for a period insufficient for carrying out the hardening reaction but sufficient for effecting etherification, and interrupting the heating before gelation takes place.

5. In a process of producing a hardenable resin, the improvement which comprises combining (1) a hardenable low molecular resol obtained from phenol and formaldehyde and free from alkaline catalyst, with (2) a substantially neutral plasticizing alkyd resin containing long aliphatic chains and having an excess of free alcoholic OH groups over the carboxylic groups of the ester forming components, said excess amounting to at least one-gram OH group per 250 g. of the resin, by protracted heating beyond the point of removal of the water contained in the condensation product in a slightly acid medium at a temperature and for a period insufficient for carrying out the hardening reaction but sufficient for effecting etherification, and interrupting the heating before gelation takes place, the proportions of the two components conforming to the rule that the number of the free hydroxyl groups of the alkyd resin does not exceed the number of the methylol groups of the phenol formaldehyde condensation product.

6. In a process of producing a hardenable resin, the improvement which comprises combining (1) a hardenable low molecular resol obtained from phenol and formaldehyde and free from alkaline catalyst, with (2) a substantially neutral plasticizing alkyd resin containing long aliphatic chains and having an excess of free alcoholic OH groups over the carboxylic groups of the ester forming components, said excess amounting to at least one-gram OH group per 250 g. of the resin, by protracted heating beyond the point of removal of the water contained in the condensation product in the presence of a small portion of a substance having an acid action at a temperature and for a period insufficient for carrying out the hardening reaction but sufficient for effecting etherification, and interrupting the heating before gelation takes place.

7. A hardenable resinous composition produced according to claim 1.

HERBERT HÖNEL.
HEINRICH MANZANO.

References Cited in the file of this patent

UNITED STATES PATENTS

| Number | Name | Date |
|---|---|---|
| 1,870,453 | Hönel | Aug. 9, 1932 |
| 1,977,652 | Strafford et al. | Oct. 23, 1934 |
| 2,289,266 | Hansen | July 7, 1942 |
| 2,337,874 | D'Alelio | Dec. 28, 1943 |

FOREIGN PATENTS

| Number | Country | Date |
|---|---|---|
| 367,001 | Great Britain | Feb. 1, 1932 |
| 688,268 | Germany | Feb. 16, 1940 |
| 889,799 | France | Jan. 19, 1944 |